United States Patent
Feki et al.

(10) Patent No.: US 11,570,046 B2
(45) Date of Patent: Jan. 31, 2023

(54) METHOD AND APPARATUS FOR ANOMALY DETECTION IN A NETWORK

(71) Applicant: Nokia Solutions and Networks Oy, Espoo (FI)

(72) Inventors: Afef Feki, Sceaux (FR); Nicolas Rots, Maurepas (FR); Fahad Syed Muhammad, Orsay (FR); Veronique Capdevielle, Magny les Hameaux (FR); Mohammad Saad Khan, Massy (FR); Tinhinane Ouadda, Massy (FR); Claudiu Mihailescu, Versailles (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/643,936

(22) Filed: Dec. 13, 2021

(65) Prior Publication Data
US 2022/0200857 A1    Jun. 23, 2022

(30) Foreign Application Priority Data
Dec. 17, 2020   (FI) ...................................... 20206323

(51) Int. Cl.
*G06F 15/173*      (2006.01)
*H04L 41/0816*   (2022.01)
(Continued)

(52) U.S. Cl.
CPC ...... *H04L 41/0816* (2013.01); *H04L 41/0823* (2013.01); *H04L 43/04* (2013.01)

(58) Field of Classification Search
CPC .. H04L 41/0816; H04L 41/0823; H04L 43/04
(Continued)

(56) References Cited

U.S. PATENT DOCUMENTS 10,616,257 B1    4/2020 Soulhi et al.
2019/0334784 A1*  10/2019 Kvernvik .............. H04W 24/08
(Continued)

FOREIGN PATENT DOCUMENTS

WO    WO-2018/133924 A1    7/2018
WO    WO 2020/159439 A1    8/2020
WO    WO 2020/173542 A1    9/2020

OTHER PUBLICATIONS

3GPP TR 28.809 V1.1.0 (Nov. 2020), "$3^{rd}$ Generation Partnership Project; Technical Specification Group Services and System Aspects; Management and orchestration; Study on enhancement of Management Data Analytics (MDA) (Release 17)" 93 pgs.

*Primary Examiner* — Atta Khan
(74) *Attorney, Agent, or Firm* — Harrington & Smith

(57) ABSTRACT

An apparatus for anomaly detection in a network, using an autoencoder including an encoder and a decoder. The apparatus includes a processor and a memory including computer program code, causing the apparatus to: providing the decoder with network configuration parameters used to obtain calculated network performance indicators, obtaining reconstructed network performance indicators from the decoder based on the network configuration parameters used to obtain the calculated network performance indicators, comparing the reconstructed network performance indicators with the calculated network performance indicators, detecting an anomaly when observing a deviation between the reconstructed network performance indicators and the calculated network performance indicators, providing the encoder with the calculated network performance indicators, obtaining estimated network configuration parameters from the encoder based on the calculated network performance indicators, detecting that the anomaly is related to the network configuration parameters.

9 Claims, 5 Drawing Sheets

(51) Int. Cl.
 *H04L 41/0823* (2022.01)
 *H04L 43/04* (2022.01)
(58) Field of Classification Search
 USPC .......................................... 709/223
 See application file for complete search history.

(56) References Cited

U.S. PATENT DOCUMENTS

| | | | |
|---|---|---|---|
| 2020/0064822 A1* | 2/2020 | Song | G05B 23/0254 |
| 2020/0236562 A1 | 7/2020 | Soundrarajan | 24/2 |
| 2020/0267174 A1 | 8/2020 | Soulhi et al. | |
| 2021/0184960 A1* | 6/2021 | Zhang | H04L 43/50 |
| 2021/0349697 A1* | 11/2021 | Nupponen | G06N 3/0445 |
| 2022/0029892 A1* | 1/2022 | Hooli | H04L 41/16 |

* cited by examiner

METHOD AND APPARATUS FOR ANOMALY DETECTION IN A NETWORK

TECHNICAL FIELD

Various example embodiments relate generally to methods and apparatus for anomaly detection in a network.

In particular, they apply to a Radio Access Network (RAN) of a mobile communication system, for example a 5G (fifth generation) system using the 5G NR (New Radio) as radio access technology (RAT) defined by 3GPP. US 2019/0334784 discloses a solution for analyzing performance of a telecommunication network.

BACKGROUND

A radio access network comprises a base station configured with network configuration parameters to communicate with one or more a user equipment over-the-air by using a radio access technology.

Before deploying a new base station release in a radio access network, the release shall go through a test and validation phase. This test and validation phase includes configuring the base station with test network configuration parameters, operating the network like a customer with commercial devices, end-to-end applications and realistic scenarii, measuring network performance indicators (KPIs), and optimizing the network configuration parameters to ensure best-in-class performances in over-the-air conditions and in customers configurations.

Anomalies can occur during the tests for various reasons (e.g. software problem, device not well configured . . . ). Traces are collected as a result of the tests that need to be processed to identify anomalies. The investigation of the collected traces is time consuming and the process is long from analysis, anomalies identification and feedback to the teams in charge of establishing the network configuration.

In addition when an anomaly is detected, it is not straightforward to figure out if the cause is related or not to the network configuration parameters. Conventionally, a kind of 'trial and error' policy is performed on the network configuration parameters where there is no guarantee that the raised anomalies can be solved with a change in the network configuration parameters and more specifically which one(s). This generally requires an expert intervention.

SUMMARY

The scope of protection is set out by the independent claims. The embodiments, examples and features, if any, described in this specification that do not fall under the scope of the protection are to be interpreted as examples useful for understanding the various embodiments or examples that fall under the scope of protection.

According to a first aspect, a method for anomaly detection in a network is disclosed, using an autoencoder comprising an encoder and a decoder, the method comprising:

providing the decoder with network configuration parameters used to obtain calculated network performance indicators, obtaining reconstructed network performance indicators from the decoder based on the network configuration parameters, comparing the reconstructed network performance indicators with the calculated network performance indicators, detecting an anomaly when observing a deviation between the reconstructed network performance indicators and the calculated network performance indicators, obtaining estimated network configuration parameters from the encoder based on the calculated network performance indicators, detecting that the anomaly is related to the network configuration parameters when observing a deviation between the estimated network configuration parameters and the network configuration parameters used to obtain the calculated network performance indicators.

According to a second aspect, a method is disclosed which further comprises:

detecting that a given network configuration parameter is causing the anomaly when observing a deviation between the estimated network configuration parameter and the network configuration parameters used to obtain the calculated network performance indicators for the given network configuration parameter, selecting a preferred value for the given network configuration parameter to optimize network performance, changing the network configuration parameters based on the preferred value.

According to another aspect an apparatus is disclosed for anomaly detection in a network, using an autoencoder comprising an encoder and a decoder, the apparatus comprising at least one processor and at least one memory including computer program code, the at least one memory and the computer program code being configured to, with the at least one processor, cause the apparatus at least to perform:

providing the decoder with network configuration parameters used to obtain calculated network performance indicators, obtaining reconstructed network performance indicators from the decoder based on the network configuration parameters, comparing the reconstructed network performance indicators with the calculated network performance indicators, detecting an anomaly when observing a deviation between the reconstructed network performance indicators and the calculated network performance indicators, obtaining estimated network configuration parameters from the encoder based on the calculated network performance indicators, detecting that the anomaly is related to the network configuration parameters when observing a deviation between the estimated network configuration parameters and the network configuration parameters used to obtain the calculated network performance indicators.

According to another aspect, an apparatus is disclosed wherein the at least one memory and the computer program code are further being configured to, with the at least one processor, cause the apparatus at least to perform:

detecting that a given network configuration parameter is causing the anomaly when observing a deviation between the estimated network configuration parameter and the network configuration parameters used to obtain the calculated network performance indicators for the given network configuration parameter, selecting a preferred value for the given network configuration parameter to optimize network performance, changing the network configuration parameters based on the preferred value.

According to another aspect, a computer program product is disclosed, comprising a set of instructions which, when executed on an apparatus, is configured to cause the apparatus to carry out a method for anomaly detection in a network, using an autoencoder comprising an encoder and a decoder, the method comprising:

providing the decoder with network configuration parameters used to obtain calculated network performance indicators, obtaining reconstructed network performance indicators from the decoder based on the network configuration parameters, comparing the reconstructed network performance indicators with the calculated network performance indicators, detecting an anomaly when observing a deviation between the reconstructed network performance indicators and the calculated network performance indicators, obtaining estimated network configuration parameters from the encoder based on the calculated network performance indicators, detecting that the anomaly is related to the network configuration parameters when observing a deviation between the estimated network configuration parameters and the network configuration parameters used to obtain the calculated network performance indicators.

According to another aspect, a computer program product is disclosed, comprising a set of instructions which, when executed on an apparatus, is configured to cause the apparatus to carry out a method for anomaly detection in a network, the method further comprising:

detecting that a given network configuration parameter is causing the anomaly when observing a deviation between the estimated network configuration parameter and the network configuration parameters used to obtain the calculated network performance indicators for the given network configuration parameter, selecting a preferred value for the given network configuration parameter to optimize network performance, changing the network configuration parameters based on the preferred value.

According to another aspect the disclosed computer program product is embodied as a computer readable medium or directly loadable into a computer.

One or more example embodiments of the present disclosure provide an apparatus for anomaly detection in a network, using an autoencoder comprising an encoder and a decoder, the apparatus comprising means for:

providing the decoder with network configuration parameters used to obtain calculated network performance indicators, obtaining reconstructed network performance indicators from the decoder based on the network configuration parameters, comparing the reconstructed network performance indicators with the calculated network performance indicators, detecting an anomaly when observing a deviation between the reconstructed network performance indicators and the calculated network performance indicators, obtaining estimated network configuration parameters from the encoder based on the calculated network performance indicators, detecting that the anomaly is related to the network configuration parameters when observing a deviation between the estimated network configuration parameters and the network configuration parameters used to obtain the calculated network performance indicators.

According to another example embodiment, the apparatus may further include means for:

detecting that a given network configuration parameter is causing the anomaly when observing a deviation between the estimated network configuration parameter and the network configuration parameters used to obtain the calculated network performance indicators for the given network configuration parameter, selecting a preferred value for the given network configuration parameter to optimize network performance, changing the network configuration parameters based on the preferred value.

According to another aspect, a method, an apparatus and a computer program product are disclosed wherein selecting a preferred value for the given network configuration parameter comprises:

retrieving a plurality of candidate values for the given network configuration parameter, predicting the network performance for the candidate values through machine learning, selecting the candidate value with the best network performance prediction.

According to another aspect, the disclosed method, apparatus and computer program product are intended to be used in a system comprising a user equipment and a base station, wherein the base station is configured with the network configuration parameters and the network performance indicators are measured at the user equipment or at the base station.

According to another aspect of the disclosed method, apparatus and computer program product, the network configuration parameters are test configuration parameters or post-deployment configuration parameters.

According to another aspect of the disclosed method, apparatus and computer program product, the autoencoder is trained to estimate network configuration parameters from network performance indicators and reconstruct network performance indicators from the estimated network configuration parameters, by minimizing:

a first error between the network performance indicators and the reconstructed network performance indicators, and a second error between the network configuration parameters and the estimated network configuration parameters.

Generally, the apparatus comprises means for performing one or more or all steps of a method for anomaly detection in a network as disclosed herein. The means may include circuitry configured to perform one or more or all steps of the method for anomaly detection as disclosed herein. The means may include at least one processor and at least one memory including computer program code, wherein the at least one memory and the computer program code are configured to, with the at least one processor, cause the apparatus to perform one or more or all steps of the method for anomaly detection as disclosed herein.

Generally, the computer-executable instructions/program code cause the apparatus to perform one or more or all steps of a method for anomaly detection as disclosed herein.

BRIEF DESCRIPTION OF THE DRAWINGS

Example embodiments will become more fully understood from the detailed description given herein below and the accompanying drawings, which are given by way of illustration only and thus are not limiting of this disclosure.

Figure 1:
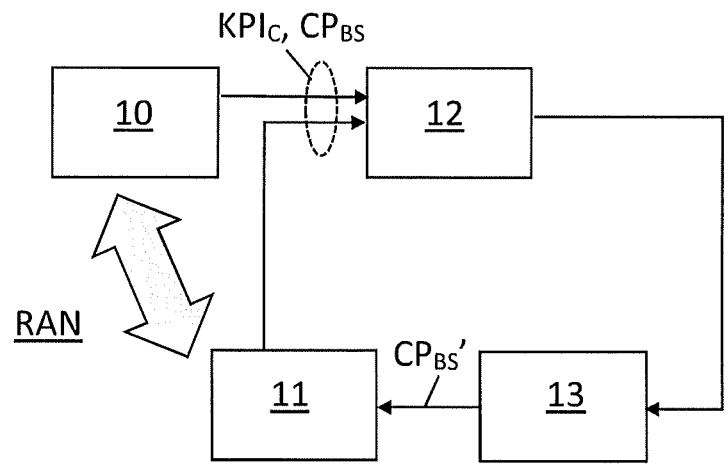
FIG. 1 is a schematic representation of an example embodiment of a system using a method and an apparatus for anomaly detection as disclosed herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed example embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Accordingly, while example embodiments are capable of various modifications and alternative forms, the embodiments are shown by way of example in the drawings and will be described herein in detail. It should be understood, however, that there is no intent to limit example embodiments to the particular forms disclosed.

FIG. 1 shows a schematic diagram illustrating a system where the disclosed method and apparatus is intended to be used. The system comprises a radio access network RAN with a user equipment 10 and a base station 11. It also comprises an apparatus 12 for anomaly detection and an interface 13 between the apparatus 12 and the base station 11. The interface 13 is used for loading network configuration parameters in the base station 11.

The apparatus 12 may be used for test and validation before deployment of a new release of the base station. It may also be used after the deployment of the base station to differentiate configuration issues from product issues in the field and optimize the network configuration of the deployed base station.

In both instances, the base station 11 is configured with given network configuration parameters $CP_{BS}$ and scenarii are run for example with different user equipment or different locations. As the result of these scenarii, data are measured at the user equipment 10 and/or at the base station 11. Network performance indicators $KPI_C$ are calculated based on measured data also referred to as traces. The calculated network performance indicators $KPI_C$ and the corresponding network configuration parameters $CP_{BS}$ are provided to the apparatus 12. Based on the calculated network performance indicators $KPI_C$ and the corresponding network configuration parameters $CP_{BS}$, the apparatus 12 detects anomalies, and additionally detects whether or not the anomalies are related to the network configuration parameters. When an anomaly is related to the network configuration parameters $CP_{BS}$, a configuration update is done by loading updated network configuration parameters $CP_{BS}'$ to the base station 11 via the interface 13.

Examples of network performance indicators are SINR (Signal to Interference and Noise Ratio) or RSRP (Reference Signal Received Power) metrics. Examples of network configuration parameters are pMax (Base station maximum output power), prachConfigurationIndex (Physical Random Access Channel Configuration index), ssbScs (Synchronization Signal Block SubCarrier Spacing).

In a first embodiment, apparatus 12 uses machine learning to automate the detection of anomalies and the detection of the cause of the anomalies. It provides the decision whether or not there is a need to change the network configuration parameters. In a second embodiment, apparatus 12 also provides information on which specific network configuration parameter(s) need to be changed. In a third embodiment, apparatus 12 also uses machine learning to provide recommended values for the specific network configuration parameter(s) requiring a change. It predicts the network performance for candidate values of the network configuration parameter(s) for each network configuration parameter requiring a change and selects the candidate value with the best network performance prediction. The selected candidate value is then used to update the configuration of the base station 11.

Machine learning allows fast and efficient resolution of anomalies. Instead of raising the alarms "manually" by comparing the measurements with predefined thresholds, the analysis is automated. This results in significant time savings.

Also, the network configuration parameters at the base station are updated only when necessary and useful. Anomalies that are not related to the network configuration parameters are identified straightforwardly and processed through conventional root cause analysis functions to identify to which factors the anomaly is mostly related (for example software bugs).

Additionally guidance may be provided on which network configuration parameters to change and how to change them.

The disclosed machine learning assisted approach uses an autoencoder. An autoencoder is a neural network that aims to copy its input to its output: more specifically an autoencoder compresses its input into a latent space representation and then reconstructs an output from the latent space representation.

Figure 2:
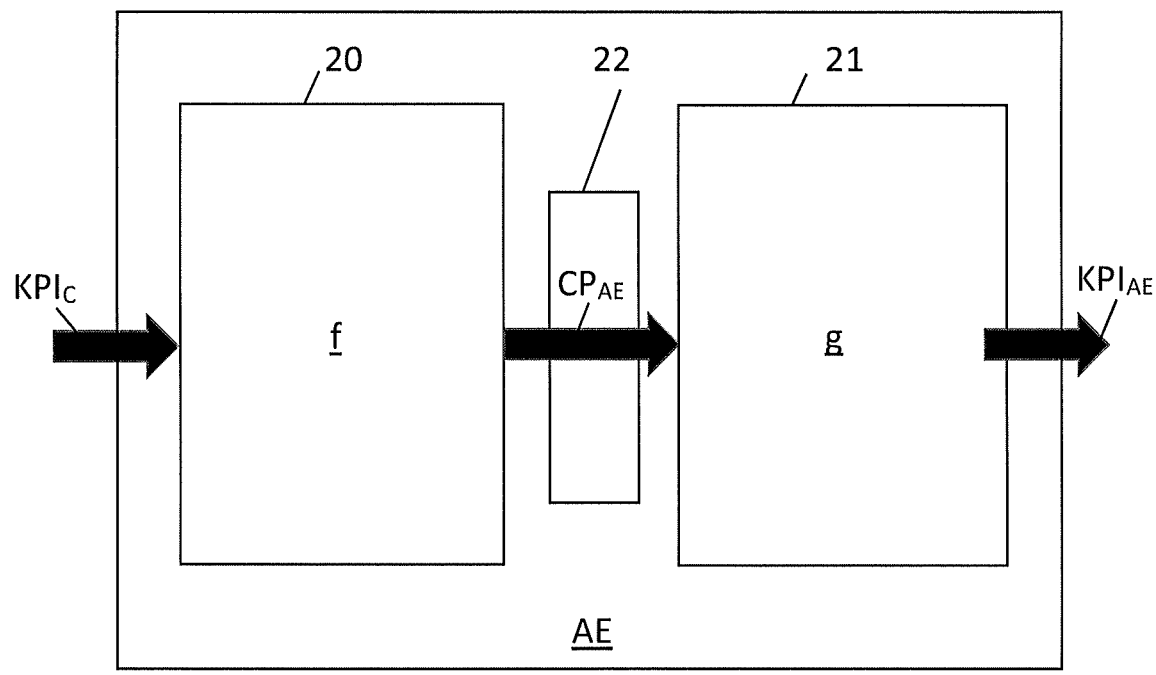
FIG. 2 is a schematic representation of an example embodiment of an autoencoder for use in a method and an apparatus as disclosed herein.

FIG. 2 is a schematic representation of an example embodiment of an autoencoder AE for use in the disclosed method and apparatus. As depicted in FIG. 2, the autoencoder AE comprises an encoder 20 and a decoder 21. The layer 22 between the encoder 20 and the decoder 21 is referred to as latent space. The encoder 20 receives network performance indicators $KPI_C$ as input and applies an encoding function f to generate estimates $CP_{AE}$ of the network configuration parameters used to obtain the network performance indicators $KPI_C$. The decoder 21 receives the estimated network configuration parameters $CP_{AE}$ as input and applies a decoding function g to generate reconstructed network performance indicators $KPI_{AE}$ from the estimated network configuration parameters $CP_{AE}$.

The autoencoder AE is trained by using data known as without anomalies, specifically network performance indicators $KPI_C$, for example from previous tests, and the corresponding network configuration parameters $CP_{BS}$. The encoder 20 and the decoder 21 are trained simultaneously by minimizing:

a first error between the network performance indicators $KPI_C$ and the reconstructed network performance indicators $KPI_{AE}$, and a second error between the network configuration parameters $CP_{BS}$ and the estimated network configuration parameters $CP_{AE}$.

Using an autoencoder has the advantage that it doesn't require high amount of labelled data to reach a well-trained machine model which can be used afterwards in inference.

Once the autoencoder is trained it can be used in real time fashion with test data in the disclosed method and apparatus.

Figure 3:
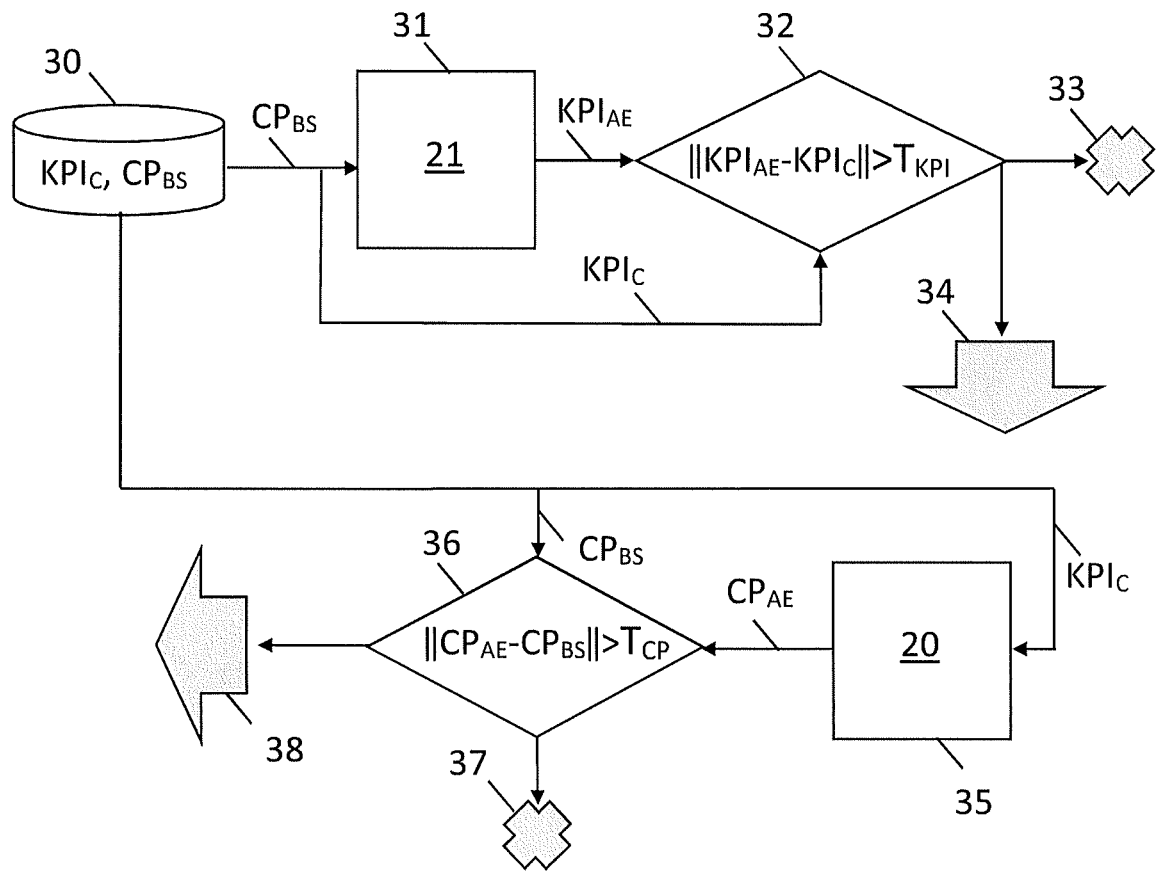
FIG. 3 is a block diagram of a first example embodiment of a method for anomaly detection.

FIG. 3 is a block diagram depicting a first embodiment of a method for anomaly detection based on an autoencoder. After the realization of a test with given network configuration parameters $CP_{BS}$, network performance indicators $KPI_C$ are measured and provided to the apparatus 12 together with the network configuration parameters $CP_{BS}$ used for the test as described above by reference to FIG. 1. The network configuration parameters $CP_{BS}$ and the calculated network performance indicators $KPI_C$ are stored in apparatus 12 at step 30. At step 31, the network configuration parameters $CP_{BS}$ are made input to the decoder function 21 of apparatus 12 and the decoder function 21 generates reconstructed network performance indicators $KPI_{AE}$. At step 32, the reconstructed network performance indicators $KPI_{AE}$ are compared with the calculated network performance indicators $KPI_C$ obtained from the test. When they are comparable (for example when their difference is below a first threshold $T_{KPI}$) the decision is made at step 33 that there is no anomaly in the test. On the contrary when a deviation is observed between the reconstructed network performance indicators $KPI_{AE}$ and the calculated network performance indicators $KPI_C$, an anomaly is detected at step 34. For example a deviation is observed when the difference between the reconstructed network performance indicators $KPI_{AE}$ and the calculated network performance indicators $KPI^C$ is higher than the first threshold $T_{KPI}$. The next steps 35 and 36 aim at detecting whether the anomaly is related or not to the network configuration parameters that have been used for the test.

At step 35 the calculated network performance indicators obtained from the test are made input to the encoder function 20 of apparatus 12 and the encoder function 20 generates an estimation $CP_{AE}$ of the network configuration parameters corresponding to the calculated network performance indicators $KPI_C$. At step 36, the estimated network configuration parameters $CP_{AE}$ are compared with the network configuration parameters used for test $CP_{BS}$. When they are comparable (for example when their difference is below a second threshold $T_{CP}$) the decision is made at step 37 that the detected anomaly is not related to the network configuration parameters used for the test (for example it may related to software bugs). On the contrary when a deviation is observed between the estimated network configuration parameters $CP_{AE}$ and the network configuration parameters used for the test $CP_{BS}$, detection is made at step 38 that the anomaly is related to the network configuration parameters used for test.

As will be understood from the above description, the two components of the autoencoder AE, namely the encoder 20 and the decoder 21, which have been trained simultaneously, are used separately when implementing the disclosed method. The anomaly detection is performed by using the decoder 21 of the autoencoder AE and the encoding 20 of the autoencoder AE is used to detect whether or not the anomaly is related to the network configuration parameters used for the test.

Figure 4:
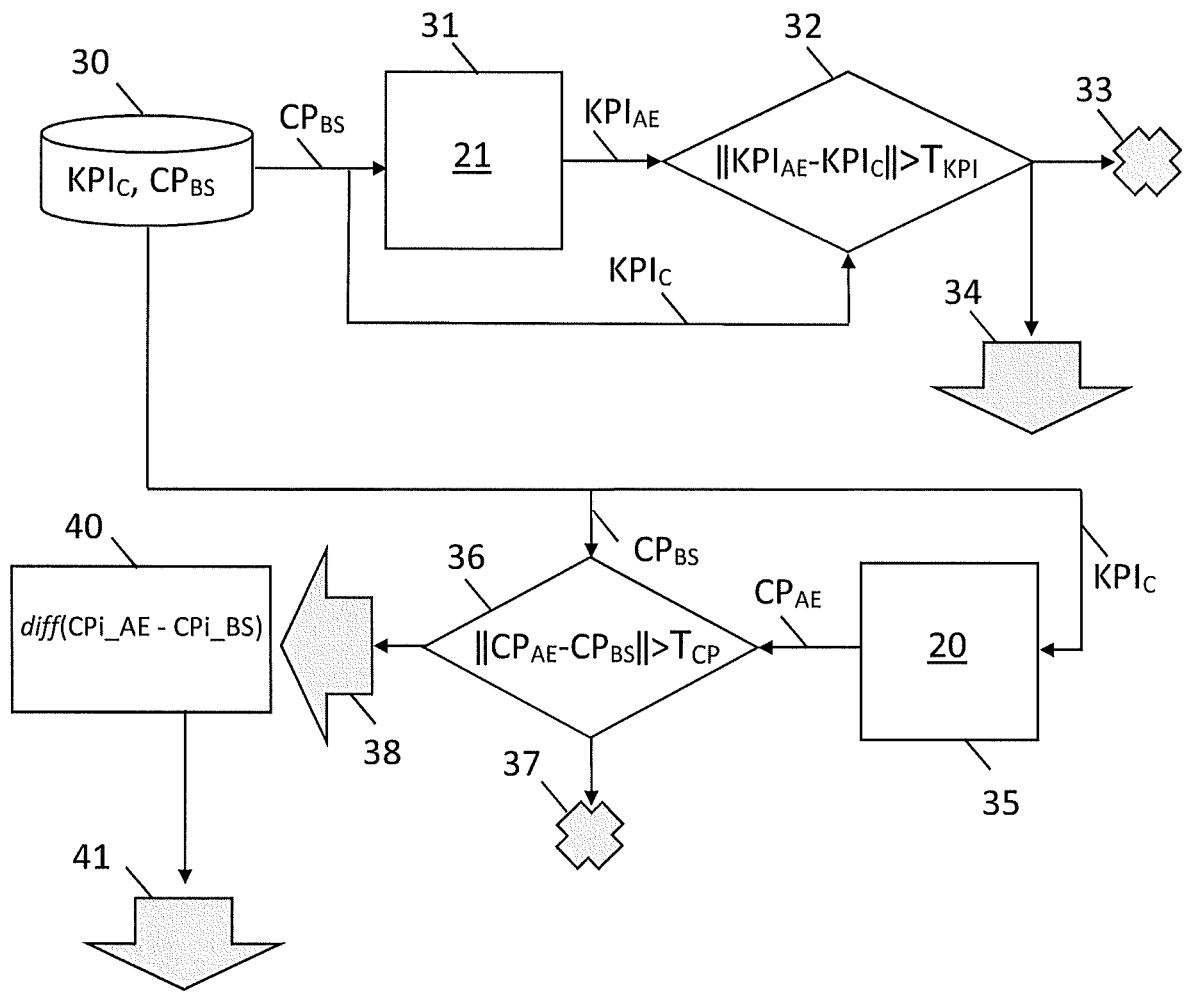
FIG. 4 is a block diagram of a second example embodiment of a method for anomaly detection.

For example the comparisons performed at steps 32 and 36 are global comparisons of the sets (or vectors) of network performance indicators and network configuration parameters respectively. FIG. 4 is a block diagram depicting a second embodiment of the disclosed method comprising additional steps 40 and 41. Additional step 40 aims at detecting which specific parameter(s) is/are causing the anomaly. For example this is done by comparing each estimated network configuration parameter CPi_AE with the corresponding network configuration parameters CPi_BS used for the test (where i=1, . . . , M with M the total number of parameters). When a deviation is observed for one or more given parameter(s), a decision is made at step 41 that the given parameter(s) is/are causing the anomaly. As a result guidance is obtained on which parameters to change in the base station configuration.

Figure 5:
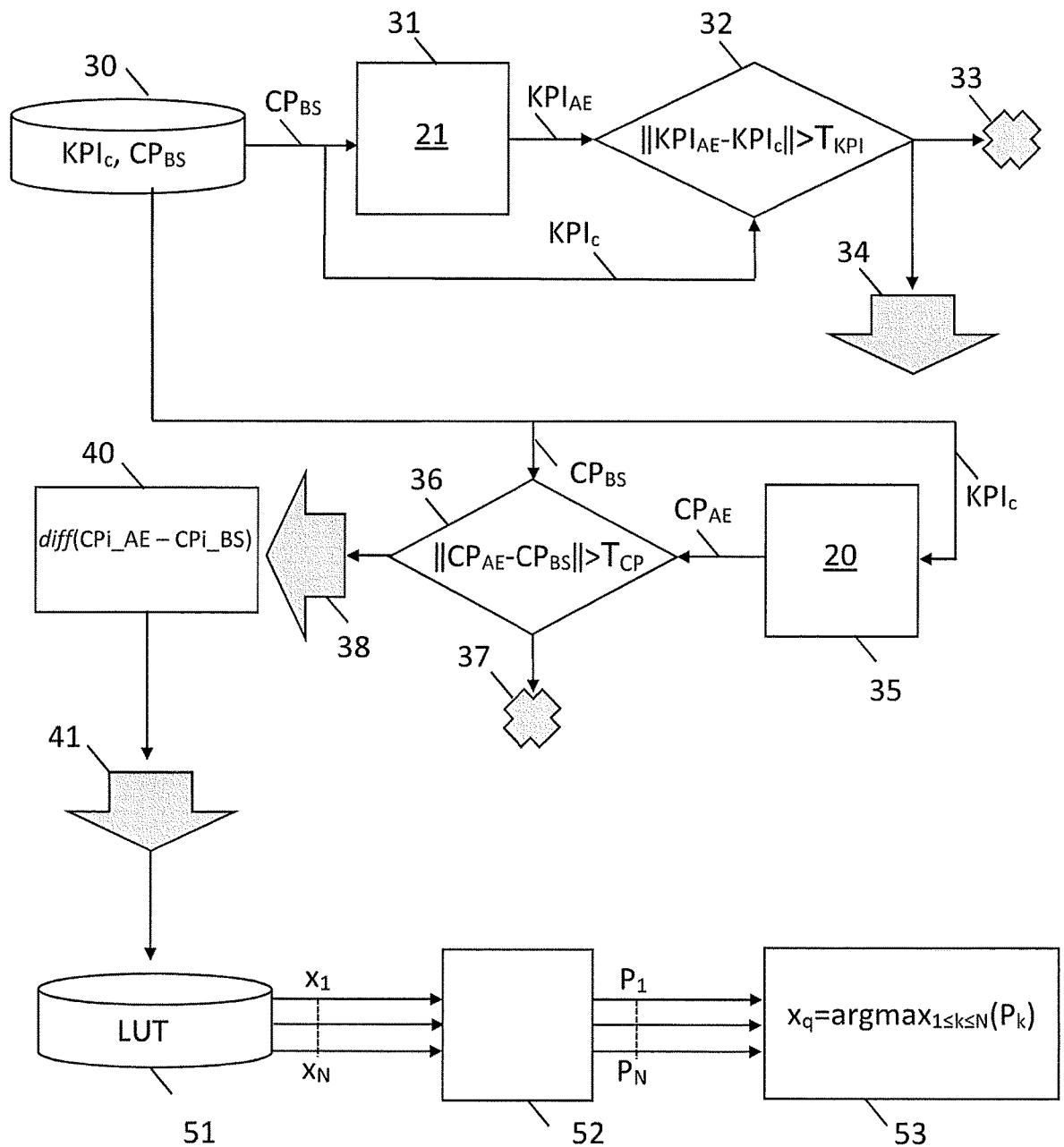
FIG. 5 is schematic diagram of a third example embodiment of a method for anomaly detection.

FIG. 5 is a block diagram of a third embodiment of the disclosed method including additional steps 51, 52 and 53. Steps 51, 52 and 53 aim at selecting a preferred value for given network configuration parameter(s) causing an anomaly in order to optimize network performance. At step 51, a plurality of candidate values $\{x_1, \ldots x_N\}$ is retrieved for each of the given network configuration parameter that causes an anomaly. For example the plurality of candidate values are obtained from a look-up-table LUT stored in the apparatus 12 and containing all possible values for each network configuration parameter. At step 52, a machine learning approach, for example a neural network, is used to predict the performance $\{P_1, \ldots, P_N\}$ that would be obtained with each candidate value $\{x_1, \ldots x_N\}$. For example this can be achieved by going again through the decoder 21. At step 53, the candidate value $x_q$ with the best network performance prediction is selected ($x_q=\mathrm{argmax}_{1 \leq k \leq N}(Pk)$). Then the base station 11 may be updated with the selected value(s) $x_q$ through the interface 13 as described above in relation to FIG. 1.

While the steps are described in a sequential manner, the man skilled in the art will appreciate that some steps may be omitted, combined, performed in different order and/or in parallel.

Figure 6:
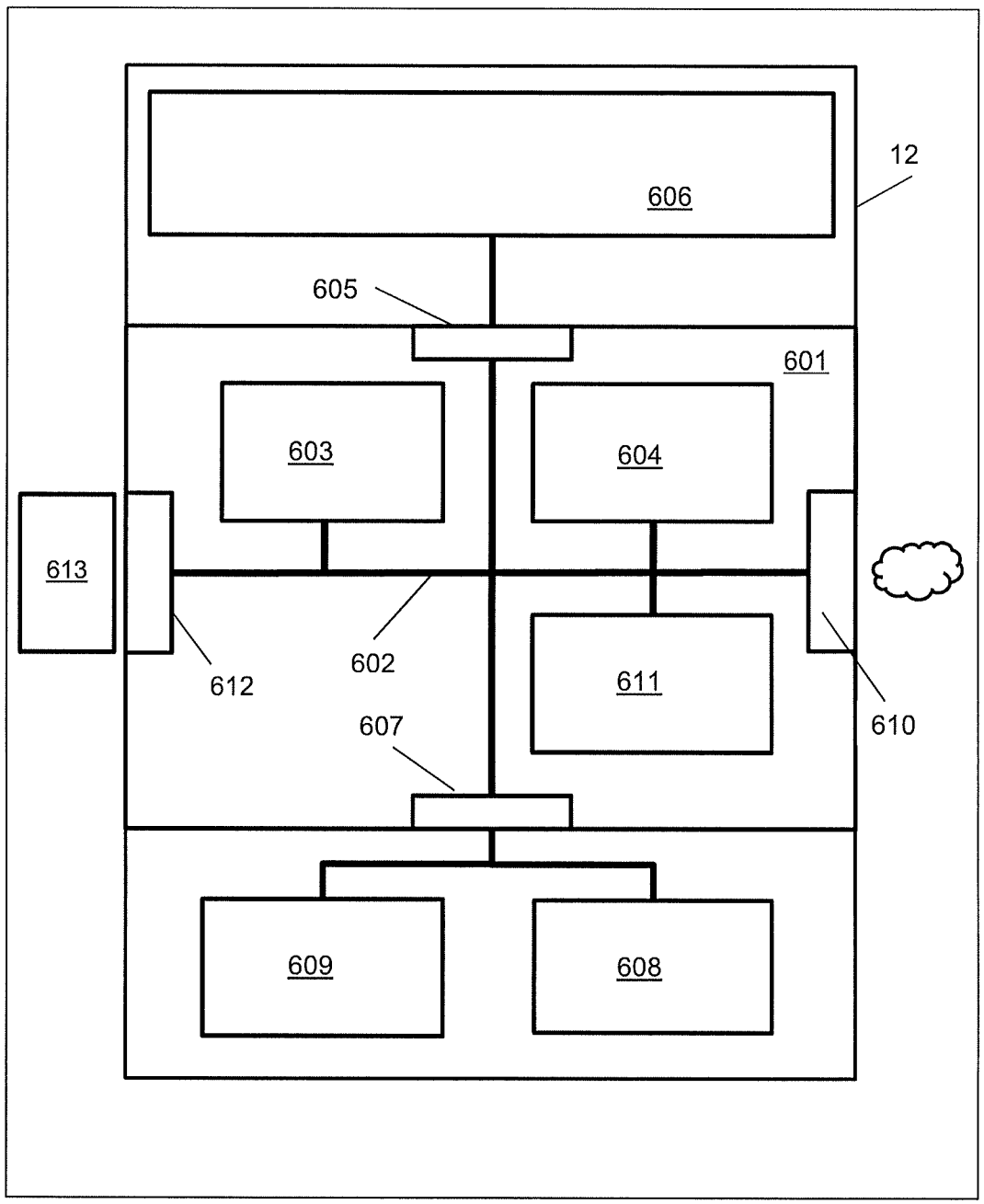
FIG. 6 is a schematic diagram of an example embodiment of an apparatus for anomaly detection.

FIG. 6 depicts a high-level block diagram of an apparatus 12 suitable for implementing various aspects of the disclosure. Although illustrated in a single block, in other embodiments the apparatus 12 may also be implemented using parallel and distributed architectures. Thus, for example, various steps such as those illustrated in the method described above by reference to FIG. 3 to 5 may be executed using apparatus 12 sequentially, in parallel, or in a different order based on particular implementations.

According to an exemplary embodiment, depicted in FIG. 6, apparatus 12 comprises a printed circuit board 601 on which a communication bus 602 connects a processor 603 (e.g., a central processing unit "CPU"), a random access memory 604, a storage medium 611, an interface 605 for connecting a display 606, a series of connectors 607 for connecting user interface devices or modules such as a mouse or trackpad 608 and a keyboard 609, a wireless network interface 610 and a wired network interface 612. Depending on the functionality required, the apparatus may implement only part of the above. Certain modules of FIG. 6 may be internal or connected externally, in which case they do not necessarily form integral part of the apparatus itself. E.g. display 606 may be a display that is connected to the apparatus only under specific circumstances, or the apparatus may be controlled through another device with a display, i.e. no specific display 606 and interface 605 are required for such an apparatus. Memory 611 contains software code which, when executed by processor 603, causes the apparatus to perform the methods described herein. Storage medium 613 is a detachable device such as a USB stick which holds the software code which can be uploaded to memory 611.

The processor 603 may be any type of processor such as a general purpose central processing unit ("CPU") or a dedicated microprocessor such as an embedded microcontroller or a digital signal processor ("DSP").

Memory 611 may store test data including measured performance indicators $KPI_C$ and their corresponding network configuration parameters $CP_{BS}$, estimated/reconstructed data including estimated network configuration parameters $CP_{AE}$ and reconstructed network performance indicators $KPI_{AE}$, reference data e.g. one or more threshold values intended to be used for detection purposes as described above, a look up table LUT which contains candidate values for the network configuration parameters, etc....

In addition, apparatus 12 may also include other components typically found in computing systems, such as an operating system, queue managers, device drivers, or one or more network protocols that are stored in memory 611 and executed by the processor 603.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure as determined based upon the claims and any equivalents thereof.

For example, the data disclosed herein may be stored in various types of data structures which may be accessed and manipulated by a programmable processor (e.g., CPU or FPGA) that is implemented using software, hardware, or combination thereof.

It should be appreciated by those skilled in the art that any block diagrams herein represent conceptual views of illustrative circuitry embodying the principles of the disclosure. Similarly, it will be appreciated that any flow charts, flow diagrams, state transition diagrams, and the like represent various processes which may be substantially implemented by circuitry.

Each described function, engine, block, step can be implemented in hardware, software, firmware, middleware, microcode, or any suitable combination thereof. If implemented in software, the functions, engines, blocks of the block diagrams and/or flowchart illustrations can be implemented by computer program instructions/software code, which may be stored or transmitted over a computer-readable medium, or loaded onto a general purpose computer, special purpose computer or other programmable processing apparatus and/or system to produce a machine, such that the computer program instructions or software code which execute on the computer or other programmable processing apparatus, create the means for implementing the functions described herein.

In the present description, block denoted as "means configured to perform . . . " (a certain function) shall be understood as functional blocks comprising circuitry that is adapted for performing or configured to perform a certain function. A means being configured to perform a certain function does, hence, not imply that such means necessarily is performing said function (at a given time instant). Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

As used herein, the term "and/or," includes any and all combinations of one or more of the associated listed items.

When an element is referred to as being "connected," or "coupled," to another element, it can be directly connected or coupled to the other element or intervening elements may be present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

The invention claimed is:

1. A method for anomaly detection in a network comprising a user equipment and a base station, using an autoencoder comprising an encoder and a decoder, the method comprising:
    providing the decoder with network configuration parameters used to obtain calculated network performance indicators,
    obtaining reconstructed network performance indicators from the decoder based on the network configuration parameters,
    comparing the reconstructed network performance indicators with the calculated network performance indicators,
    detecting an anomaly when observing a deviation between the reconstructed network performance indicators and the calculated network performance indicators, obtaining estimated network configuration parameters from the encoder based on the calculated network performance indicators, detecting that the anomaly is related to the network configuration parameters when observing a deviation between the estimated network configuration parameters and the network configuration parameters used to obtain the calculated network performance indicators, detecting that a given network configuration parameter is causing the anomaly when observing a deviation between the estimated network configuration parameter and the network configuration parameters used to obtain the calculated network performance indicators for the given network configuration parameter, selecting a preferred value for the given network configuration parameter to optimize network performance, and changing the network configuration parameters based on the preferred value, wherein the base station is configured with the network configuration parameters and the network performance indicators are measured at the user equipment or at the base station.

2. The method as claimed in claim 1, wherein selecting a preferred value for the given network configuration parameter comprises:

retrieving a plurality of candidate values for the given network configuration parameter, predicting the network performance for the candidate values through machine learning, selecting the candidate value with the best network performance prediction.

3. The method as claimed in claim 1, wherein the network configuration parameters are test configuration parameters or post-deployment configuration parameters.

4. The method as claimed in claim 1, wherein the autoencoder is trained to estimate network configuration parameters from network performance indicators and reconstruct network performance indicators from the estimated network configuration parameters, by using:

a first error between the network performance indicators and the reconstructed network performance indicators, and a second error between the network configuration parameters and the estimated network configuration parameters.

5. An apparatus for anomaly detection in a network comprising a user equipment and a base station, using an autoencoder comprising an encoder and a decoder, the apparatus comprising at least one processor and at least one memory including computer program code, the at least one memory and the computer program code being configured to, with the at least one processor, cause the apparatus at least to perform:

providing the decoder with network configuration parameters used to obtain calculated network performance indicators, obtaining reconstructed network performance indicators from the decoder based on the network configuration parameters, comparing the reconstructed network performance indicators with the calculated network performance indicators, detecting an anomaly when observing a deviation between the reconstructed network performance indicators and the calculated network performance indicators, obtaining estimated network configuration parameters from the encoder based on the calculated network performance indicators, detecting that the anomaly is related to the network configuration parameters when observing a deviation between the estimated network configuration parameters and the network configuration parameters used to obtain the calculated network performance indicators, detecting that a given network configuration parameter is causing the anomaly when observing a deviation between the estimated network configuration parameter and the network configuration parameters used to obtain the calculated network performance indicators for the given network configuration parameter, selecting a preferred value for the given network configuration parameter to optimize network performance, and changing the network configuration parameters based on the preferred value, wherein the base station is configured with the network configuration parameters and the network performance indicators are measured at the user equipment or at the base station.

6. A computer program product comprising a non-transitory medium including a set of instructions which, when executed on an apparatus, is configured to cause the apparatus to carry out the method as claimed in claim 1.

7. The apparatus as claimed in claim 5, wherein selecting a preferred value for the given network configuration parameter comprises:

retrieving a plurality of candidate values for the given network configuration parameter, predicting the network performance for the candidate values through machine learning, selecting the candidate value with the best network performance prediction.

8. The apparatus as claimed in claim 5, wherein the network configuration parameters are test configuration parameters or post-deployment configuration parameters.

9. The apparatus as claimed in claim 5, wherein the autoencoder is trained to estimate network configuration parameters from network performance indicators and reconstruct network performance indicators from the estimated network configuration parameters, by using:

a first error between the network performance indicators and the reconstructed network performance indicators, and a second error between the network configuration parameters and the estimated network configuration parameters.

* * * * *